(12) United States Patent
Onishi et al.

(10) Patent No.: US 6,425,675 B2
(45) Date of Patent: Jul. 30, 2002

(54) PLANAR LIGHT SOURCE AND DISPLAY DEVICE USING THE SAME

(75) Inventors: Ikuo Onishi; Katsuya Fujisawa; Isao Hamashima; Shinji Hiramatsu, all of Tsukuba; Yoichi Hashimoto, Hiroshima, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/841,610

(22) Filed: Apr. 25, 2001

(30) Foreign Application Priority Data

Apr. 27, 2000 (JP) .................................. 2000-127315
Jun. 16, 2000 (JP) .................................. 2000-181326

(51) Int. Cl.[7] .......................... F21V 5/02; G02F 1/1335
(52) U.S. Cl. .................... 362/31; 362/330; 362/339; 349/65
(58) Field of Search ............................. 349/62, 64, 65; 362/31, 330, 331, 339

(56) References Cited

U.S. PATENT DOCUMENTS

| | | | | | |
|---|---|---|---|---|---|
| 5,711,589 | A | * | 1/1998 | Oe et al. ........................ | 362/31 |
| 6,086,212 | A |   | 7/2000 | Onishi et al. .................. | 362/31 |
| 6,244,719 | B1 | * | 6/2001 | Oda et al. ...................... | 362/31 |
| 6,309,080 | B1 | * | 10/2001 | Sasako et al. ................. | 362/31 |
| 6,322,225 | B1 | * | 11/2001 | Koike ........................... | 362/31 |
| 6,357,888 | B1 | * | 3/2002 | Takata et al. .................. | 362/31 |

FOREIGN PATENT DOCUMENTS

| | | |
|---|---|---|
| JP | 08-221013 | 8/1996 |
| JP | 2000-66030 | 3/2000 |

* cited by examiner

*Primary Examiner*—Alan Cariaso
(74) *Attorney, Agent, or Firm*—Oblon, Spivak, McClelland, Maier & Neustadt, P.C.

(57) ABSTRACT

A planar light source device includes a light source 2, a reflector shade 8, a light guide member 3 having at least one side face 1 positioned adjacent the light source for receiving light from the light source and reflected by the reflector shade, and a light output plate 4 positioned adjacent the light guide member 3 with a first surface positioned adjacent a light exit surface of the light guide member 3. The first surface is formed with a multiplicity of projections 7 having respective tips held in tight contact with the light exit surface of the light guide member 3, at least a portion of each of the projections 7 having a curved facet. Of a function descriptive of a sectional shape of each of the projections 7 that is parallel to a direction of travel of light and also a direction normal to the light output plate 4, the maximum value of the absolute value of a linear differential of a portion representative of a facet counter to the light source is chosen to be within the range of 1 to 3.

30 Claims, 12 Drawing Sheets

——— Linear Differential
------ Quadric Differential

PLANAR LIGHT SOURCE AND DISPLAY DEVICE USING THE SAME

BACKGROUND OF THE INVENTION

1. Field of the Invention

The present invention generally relates to a planar light source and a direct-vision display device using such planar light source suited for use in personal computers, computer monitors, video cameras, television receiver sets, car navigation systems, advertising billboards and so on.

2. Description of the Prior Art

A transmission type display device, particularly that represented by a liquid crystal panel and an advertising video billboard, is generally made up of a planar light source element (backlight source) for emitting light from one surface thereof and a display panel for presentation of images. In this transmission type display device, controlling the transmissivity of light through the display panel allows in images such as letters and/or pictures presented on the display panel to be viewed by those watching the display device. The backlight source is nowadays available in various types including the type in which while a halogen lamp, a reflecting plate and a lens are employed in combination the pattern of distribution of luminance of light emerging outwardly from the display device is controlled; the type in which a tubular fluorescent lamp is positioned adjacent one end face of a light guide member so that light from the tubular fluorescent lamp can emerge outwardly from one surface of the light guide member lying orthogonal to such one end face thereof; and the type (in-laid type) in which a tubular fluorescent lamp is positioned inside a light guide member. The backlight source utilizing a halogen lamp is mainly used in a liquid crystal video projector that generally requires a kind requiring a high luminance. On the other hand, the backlight source employing a light guide member is in most cases used in a direct vision liquid crystal television monitor and a personal computer display because the light guide member makes it possible to reduce the thickness of the backlight source. The backlight source of the in-laid type is simple in structure and is, therefore, mostly used in relatively large lighting billboards.

It is well known that low power consumption and light output of a high luminance are important requirements that the backlight source used particularly in liquid crystal television receiver sets and note-size personal computers should meet. Although the high luminance light output can be readily available if the number of light sources such as cold cathode fluorescent lamps used is increased, the use of the increased number of the light sources is not practical as it leads to increase of the electric power consumption.

Accordingly, a planar light source device including light sources, a light guide member and an array of microprisms such as shown in FIG. 18 has hitherto been employed and suggested in, for example, U.S. Pat. No. 5,396,350. According to this US patent, since the microprisms are formed on a plane, the array of the microprisms distributed over such plane is susceptible to variation in pattern of distribution of angles of emergence of light from the planar light source device and, therefore, no sufficient frontal luminance characteristic can be secured virtually.

Where in the planar light source device an array of microlenslets is disposed on one surface of the light guide member remote from the microprism array, a sufficient frontal luminance characteristic can be secured with no substantial variation occurring in pattern of distribution of angles of emergence of light from the planar light source device. However, in this type of the planar light source device, the positional relationship between the microprisms and the microlenslets must be set up accurately. While accurate positioning of the microlenslets relative to the microprisms appears to be possible if the microlenslet array and the microprism array are spaced a substantial distance from each other, a relatively small spacing between the microlenslet array and the microprism array makes it extremely difficult to achieve an accurate alignment between the microlenslets and the microprisms, bringing about a cause of reduction in productivity and, hence, increase of the manufacturing cost.

As discussed above, the use of the planar array of the microprisms makes it difficult to eventually provide the planar light source device of a type in which utilization of light from the light source is maximized while exhibiting a relatively high frontal luminance characteristic.

Where in the microprism array of the structure shown in FIG. 18 the light source, for example, a tubular lamp is disposed in the vicinity of only one end face of the light guide member, only one of facets of each of the microprisms is utilized in dealing with the incident light from the light source while the facet of each microprisms opposite to such one of the facets is not utilized in this sense and, therefore, no region of each microprism adjacent the non-utilized facet is effectively and efficiently utilized, resulting in reduction in efficiency of utilization of light. Hence, the use of the light source adjacent only one end face of the light guide member is ineffective to provide the planar light source device capable of exhibiting a high luminance.

Even in the planar light source device of the structure shown in FIG. 18, depending on a combination of refractive indexes of materials used to form the respective component parts, light emerging outwardly from the planar light source device in a direction slantwise relative to a light exit surface thereof having diverged from a frontal direction normal to the plane of the light exit surface cannot be suppressed to a low illuminance and, hence, the efficiency of utilization of light is relatively low, failing to provide the planar light source device capable of exhibiting a high luminance.

On the other hand, the Japanese Laid-open Patent Publication No. 8-221013, for example, discloses a backlighting device of a structure comprising a first planar light guide member for directing light, incident thereon from a light source positioned adjacent one end of such first planar light guide member, so as to provide a plane-oriented light traveling in a direction perpendicular to the first planar light guide member, and a second planar light guide member having a multiplicity of surface-curved projections formed on one surface thereof adjacent the first planar light guide member.

This known backlighting device has been found having a problem. Specifically, since the angle of inclination of the curved surface of each of the projections formed in the second planar light guide member, particularly that of the curved surface adjacent the base of each projection, is so large (for example, each projection being of an elliptical shape in which the ratio between the major axis relative to the minor axis is 1:2) that light incident on the second planar light guide member from a light source tends to be reflected backwards towards the light source in a relatively large proportion. Because of the relatively large proportion of light reflected backwards towards the light source, the intensity of the plane-oriented light traveling in the frontal direction tends to be lowered.

Also, in the backlighting device of the type employing the above described multiplicity of surface-curved projections, it has been suggested to provide the light guide member with a light controlling sheet for facilitating emergence of the outgoing light. Since in this structure, total reflection of light is utilized and a loss of light is therefore minimal, allowing the display device to exhibit a high luminance. However, in this backlighting device, tips of the projections on the light controlling sheet have to be optically bonded to the light guide member. To achieve this bonding, while the use may be contemplated of a highly transparent adhesive agent, a highly transparent ultraviolet curable resin or a highly transparent thermosetting resin, a point or line bonding is generally employed to bond the tips of the projections on the light controlling sheet to the light guide member and, therefore, a problem has been found in that the bonding strength is low. Specifically, in the event of change in environment such as change in temperature and/or relative humidity, the difference in thermal expansion coefficient and/or hygroscopic expansion coefficient between the light controlling sheet and the light guide member leads to generation of a relatively large shearing force in the vicinity of the perimeter of the planar light source device, resulting in separation of the light controlling sheet from the light guide member.

SUMMARY OF THE INVENTION

In view of the foregoing, the present invention has been devised to provide an improved planar light source device capable of maximizing utilization of light and exhibiting a high luminance in a frontal direction, i.e., in a direction forwardly of and normal to the light exit surface thereof.

Another important object of the present invention is to provide an improved display device utilizing the planar light source device of the type referred to above and capable of exhibiting a high luminance.

In order to accomplish these objects of the present invention, there is, in accordance with one aspect of the invention, provided a planar light source device which includes a light source, a reflector shade, a light guide member having a light exit surface and also having at least one side face positioned adjacent the light source for receiving light that is emitted from the light source and reflected by the reflector shade, and a light output plate having first and second surfaces opposite to each other and positioned in face-to-face relation with the light guide member with the first surface positioned adjacent the light exit surface of the light guide member. The first surface is formed with a multiplicity of projections having respective tips held in tight contact with the light exit surface of the light guide member, at least a portion of each of the projections having a curved face. Of a function descriptive of a sectional shape of each of the projections that is parallel to a direction of travel of light and also a direction normal to the light output plate, the maximum value of the absolute value of a linear differential of a portion representative of a facet counter to the light source is chosen to be within the range of 1 to 3.

The term "direction of travel of light" referred to hereinbefore and hereinafter is intended to means a direction parallel to the light exit surface of the light guide member and orthogonal to a light emitting surface of the light source. The light emitting surface of the light source referred to above means, where the light source is in the form of, for example a tubular fluorescent lamp as shown in FIG. 1, an outer peripheral surface thereof.

According to the structure described above, when of a function descriptive of a sectional shape of each of the projections that is parallel to a direction of travel of light and also a direction normal to the light output plate, the maximum value of the absolute value of a linear differential of a portion representative of a facet counter to the light source is chosen to be within the range of 1 to 3, the luminance in the frontal direction can be increased and, therefore, the planar light source device exhibiting a high efficiency of utilization of light and a high luminance in the frontal direction can be obtained.

Preferably, of the function descriptive of the sectional shape of each of the projections a quadric differential value of that portion representative of the facet counter to the light source is chosen to be within the range of −10 to 20 [1/unitary length], where the unitary length (a. u.) is represented by a length of such each portion of projection as measured in a direction parallel to the direction of travel of light.

Also preferably, the fimction descriptive of the sectional shape of each of the projections has a point of inflection.

If the planar light source device of the present invention is combined with the transmissive type display element, for example, a liquid crystal display element, a printed film and a molded member having a light scattering capability, a display device capable of exhibiting a high luminance in the frontal direction can be obtained.

According to another aspect of the present invention, the planar light source device is featured in that each of the projections has an axis inclined relative to the direction normal to the light output plate and forms an acute angle relative to the direction of travel of light.

The axis of each projection is represented by an Y-axis of the system of coordinates that is set up so that the function descriptive of the sectional shape of each projection taken in a direction parallel to the direction of travel of light and also a direction normal to the light output plate represents an approximately even function.

According to this preferred design, the proportion of the facets of the projections of the light output plate, which confront the light incident end face and are not utilized can advantageously be reduced so that the number of the projections that can be formed on the light output plate can be increased to increase the luminance.

According to a further aspect of the present invention, the light guide member and the tips of the projections of the light output plate are optically coupled with each other through at least one optically transparent layer.

This design is particularly effective in that since the intensity of light emerging outwardly in a direction slantwise, i.e., diverting from the frontal direction can be lowered, it is possible to provide the planar light source device having a high efficiency of utilization of light and a high luminance.

In one preferred embodiment, the projections of the light output plate has a refractive index that is greater than the refractive index of the light guide member and the refractive index of the optically transparent layer is greater than the refractive index of the light guide member.

In addition, the optically transparent layer positioned between the light guide member and the light output plate preferably has a refractive index that is smaller than the refractive index of the projections of the light output plate.

According to a still further aspect of the present invention, the planar light source device of the present invention is featured in that the optically transparent layer includes at least an intermediate film and a bond layer disposed on each of opposite surfaces of the intermediate film and the ratio of a hygroscopic expansion coefficient of the intermediate film relative to that of the light output plate is chosen to be within the range of 0.1 to 10 and/or the radio of a thermal expansion coefficient of the intermediate film relative to that of the light output plate is chosen to be within the range of 0.5 to 2.

According to this design, since the shearing stress resulting from change in environment can be set up between the light guide member and the intermediate film, the shearing stress which will develop between the projections and the intermediate film for emergence of light can be relieved, making it difficult for the light output plate to separate. Accordingly, the planar light source device robust against change in environment can be obtained.

The present invention also provides a method of making the planar light source device of the structure described above. During the manufacture of the planar light source device, the tips of the projections of the light output plate and the intermediate film are bonded together by means of a bonding agent and the intermediate film and the light guide member are also bonded together by means of a bonding agent. It is to be noted that the term "bonding agent" referred to above and hereinafter is intended to encompass not only a bonding material which undergoes hardening to exhibit a bonding strength, but also an adhesive agent that does not harden.

Preferably, the step of bonding the tips of the projections of the light output plate and the intermediate film together includes a substep of contacting them by means of a semi-hardened bonding agent and a substep of subsequently hardening the semi-hardened bonding agent completely.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
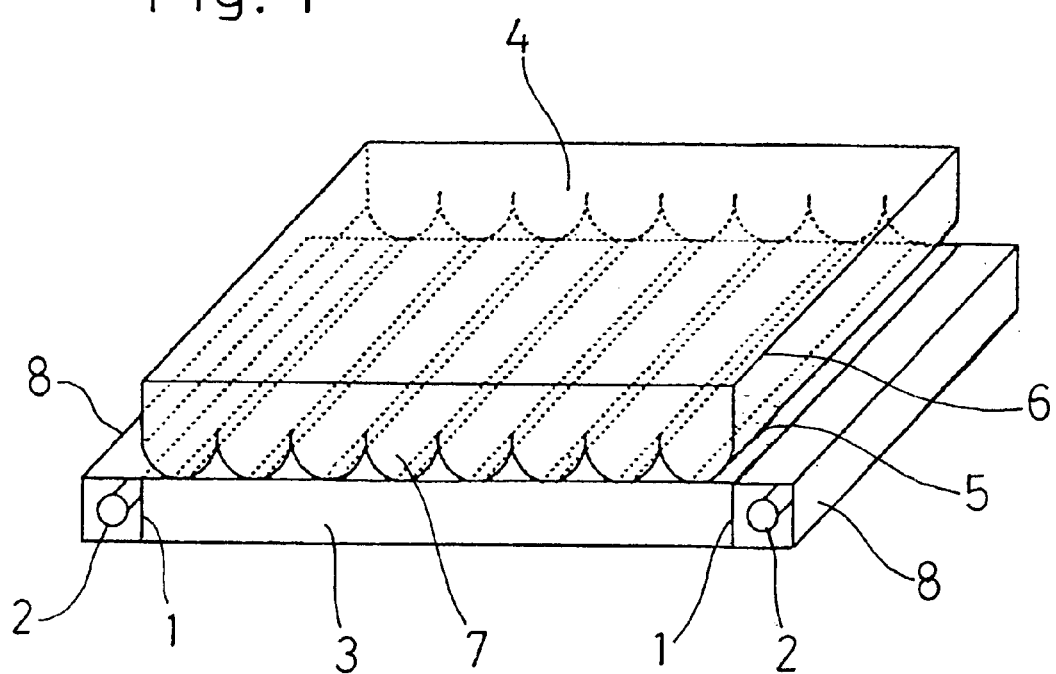
FIG. 1 is a perspective view showing a schematic structure of a planar light source device according to a first preferred embodiment of the present invention.
Figure 2A:
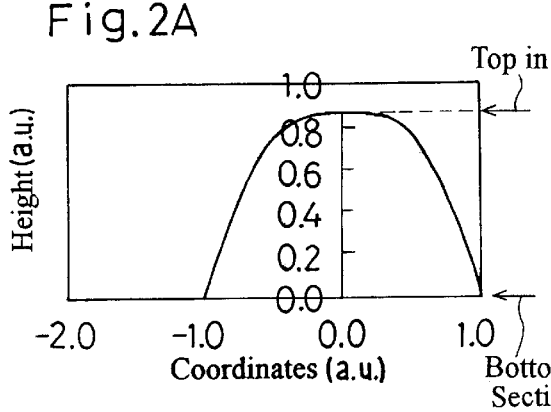
FIGS. 2A to 2C are respective charts showing functions descriptive of a sectional shape of each of a multiplicity of projections formed in a light output plate employed in the planar light source device shown in FIG. 1.
Figure 2B:
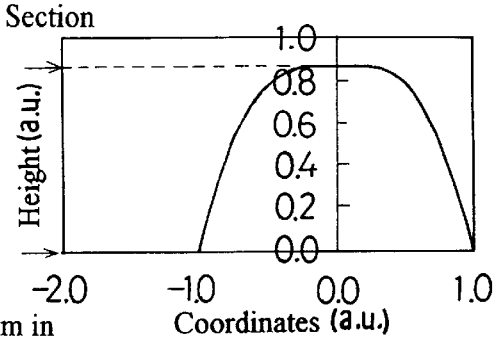
Figure 2C:
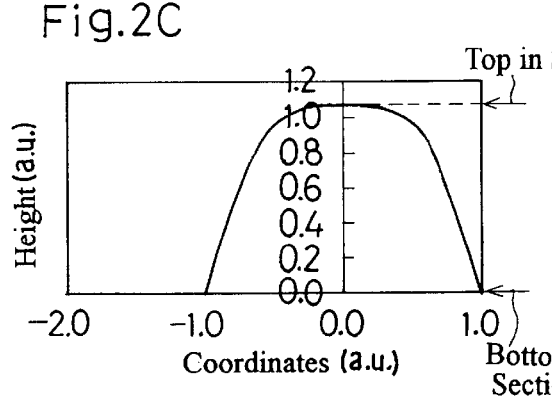
Figure 2D:
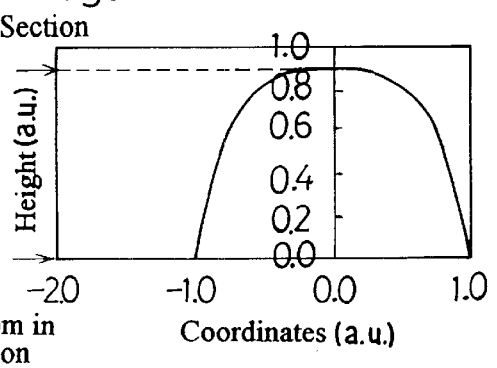
FIG. 2D is a chart showing an example of the function descriptive of the sectional shape of the corresponding projection employed in the prior art light source device.

Referring first to FIG. 1, there is schematically shown the structure of a planar light source device according to a first preferred embodiment of the present invention. The planar light source device shown therein includes a generally rectangular light guide member 3 having first and second major surfaces opposite to each other, and a light output plate 4 of a shape which may be similar to the shape of the light guide member 3 and is operable to control a pattern of an angle of emergence of light emerging outwardly from the light guide member 3. Generally tubular light sources 2 are positioned in the vicinity of opposite end faces 1 of the light guide member 3. The light output plate 4 has light incident and exit surfaces 5 and 6 opposite to each other and is mounted on the light guide member 3 with the light incident surface 5 thereof held in face-to-face relation with the first major surface of the light guide member 3. The incident surface 5 of the light output plate 4 is formed with a multiplicity of projections 7, respective tips of which are held in tight contact with the first major surface of the light guide member 3. Although not shown, a cement layer or an adhesive layer may intervene between the light guide member 3 and the light output plate 4. The projections 7 in the illustrated embodiment represents a one-dimensional pattern and have their respective ridge lines extending parallel to each other and also parallel to the opposite end faces 1 of the light guide member 3 where the associated tubular light source 2 are disposed. Each of the tubular light sources 2 is covered by a reflector shade 8 of a design effective to allow light, then traveling from the corresponding light source 2 in a direction away from the light guide member 3, to be reflected so as to travel towards the adjacent end face 1 of the light guide member 3.

Light entering from the tubular light sources 2 into the light guide member 3 through the end faces 1 undergoes total reflection repeatedly during its propagation within the light guide member 3. The light undergoing such total reflection subsequently propagates into the light output plate 4 through the interface between the light guide member 3 and the respective ridges of the projections 7 in the light output plate 4. Thus, the light propagating in the light guide member 3 enters the light output plate 4 through the interface and are them emitted outwardly from the light exit surface 6 of the light output plate 4 after having undergone total reflection within the projections 7 of the light output plate The inventors of the present invention have conducted extensive studies on various light output plates each having the projections 7 of a different shape to determine the right shape for the projections 7 in terms of the maximized luminance exhibited by the planar light source device. As a result of these extensive studies, it has been found that, of the various functions descriptive of the sectional shape of the projections that extend in a direction conforming to the direction of travel and normal to the light output plates, when the maximum value of the absolute value of the linear differential of the function descriptive of one of facets of the projections remote from the light source is chosen to be within the range of 1 to 3, the luminance in the frontal direction can advantageously be increased. FIGS. 2A to 4D illustrate the functions descriptive of the sectional shape of the projections in the light output plate, values of the linear differential and those of the quadric differential, and results of calculation of pattern of distribution of the luminances, respectively. In FIGS. 2A to 2D, the axis of abscissas represents the coordinates (unitary length (a. u.)) and the axis of ordinates represents the height (a. u.); in FIGS. 3A to 3D, the axis of abscissas represents the coordinates (a. u.) and the axis of ordinates represents the linear differential value (non-dimension) and the quadric differential value (1/a. u.); and in FIGS. 4A to 4D, the axis of abscissas represents the angle of emergence of light (degree) and the axis of ordinates represents the luminance (a. u.) FIGS. 2A to 2C, FIGS. 3A to 3C and FIGS. 4A to 3C pertain to data associated with the pattern of the sectional shape of the projection according to the present invention whereas FIG. 2D, FIG. 3D and FIG. 4D pertain those according to the prior art.

The linear differential and the quadric differential of the sectional shape of each of the projections can be determined by the following manner. In the first place, the projection is cut along a line orthogonal to the direction of the corresponding ridge, and the resultant section is photographed using a microscope. Then, the unitary length (a. u.) is divided into 10 equal points or more, followed by determination of the height (Yi) relative to each coordinate (Xi). They are then normalized by the unitary height according to the following formulas:

$$Xi'=Xi/a.\ u.$$

$$Yi'=Yi/a.\ u.$$

Thereafter, a cubic spline interpolation is carried out to the data stream to thereby determine the function descriptive of the shape of the projection and, accordingly, the linear and quadric differentials of this function can be obtained.

Figure 3A:
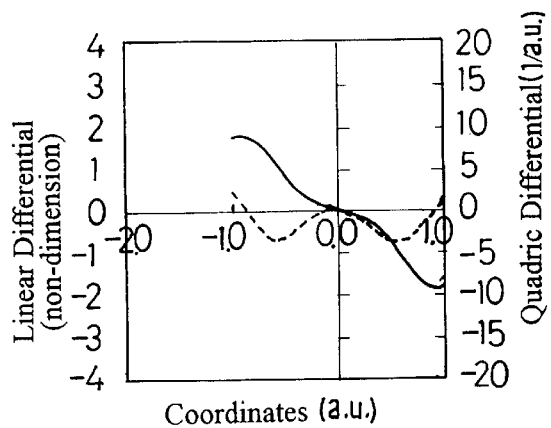
FIGS. 3A to 3C are characteristic graphs showing examples of linear differential functions and quadric differential functions of FIGS. 2A to 2C, respectively.
Figure 3B:
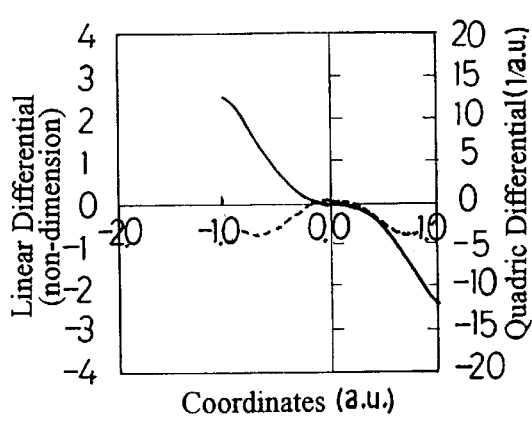
Figure 3C:
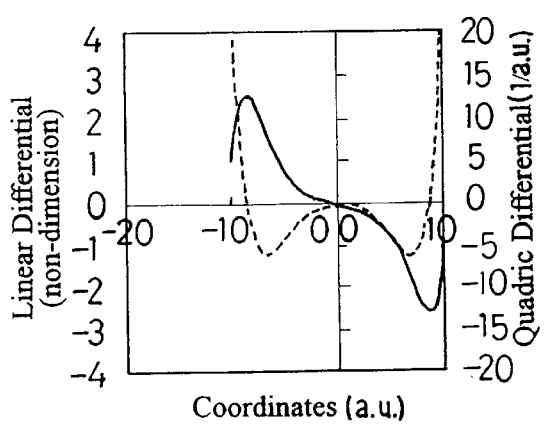
Figure 3D:
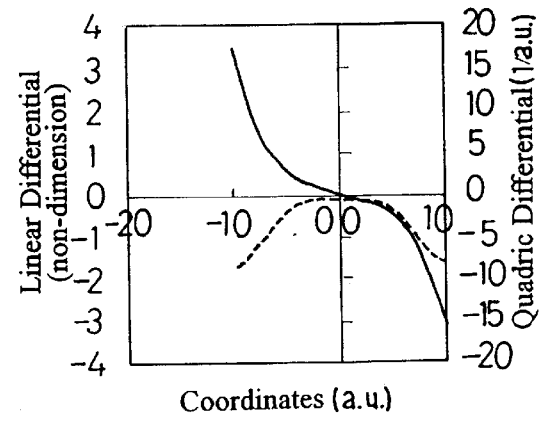
FIG. 3D is a characteristic graph showing an example of a linear differential function and a quadric differential function of FIG. 2D.
Figure 5:
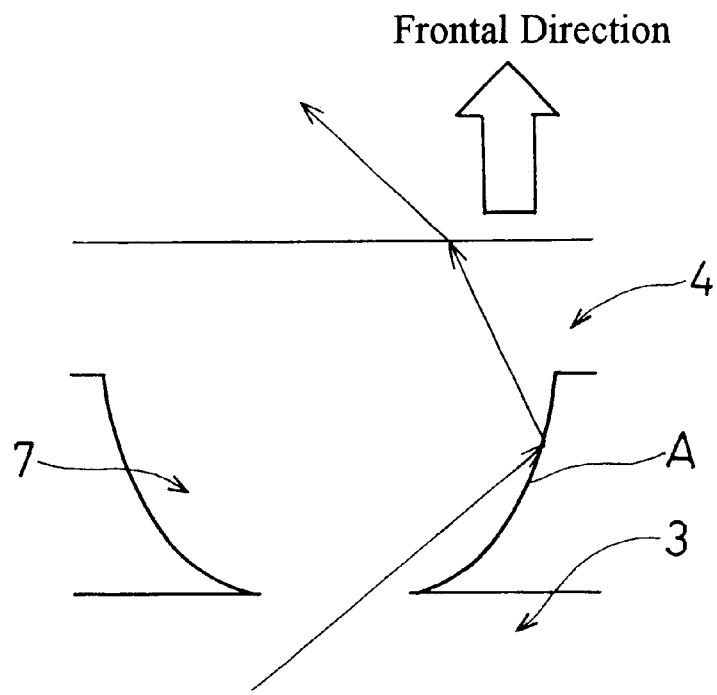
FIG. 5 is a diagram showing a direction of travel of light when one projection is inclined at a relatively great angle.
Figure 6:
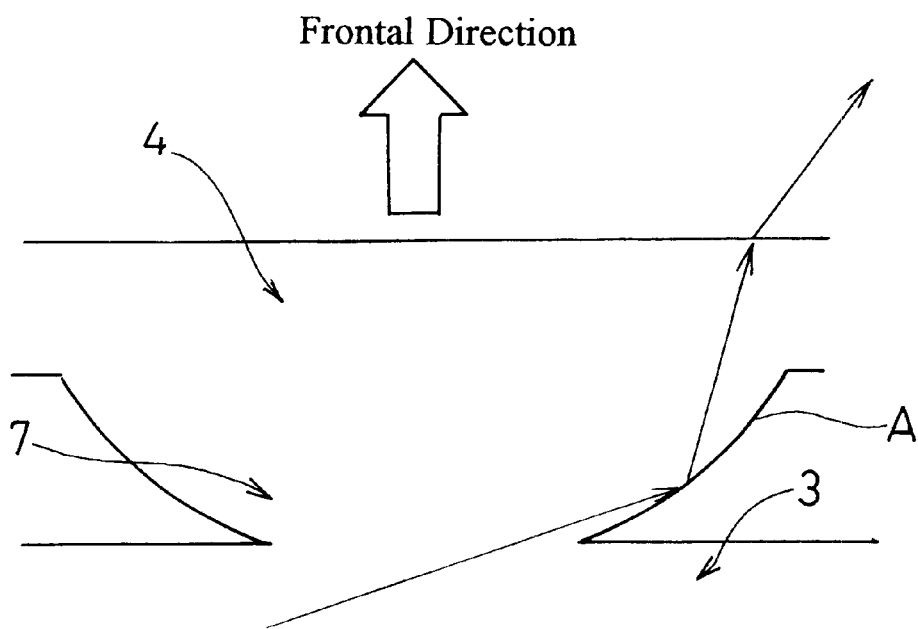
FIG. 6 is a diagram showing a direction of travel of light when the projection is inclined at a relatively small angle.

If the maximum value of the absolute value of the linear differential is greater than 3 and the angle of inclination of the facet A of the projection is large such as exhibited by the sectional shape of the projection used in the prior art as shown in FIG. 3D, as shown in FIG. 5, a proportion of the light incident on the light output plate, but reflected towards the light source will increase, resulting in lowering of the luminance in the frontal direction. Also, if the maximum value of the absolute value of the linear differential is smaller than 1 and the angle of inclination of the facet A of the projection is small, the proportion of the incident light reflected in a direction counter to the light source will increase as shown in FIG. 6, similarly resulting in lowering of the luminance in the frontal direction. Also, examination of the various shapes of the projection has revealed that the quadric differential value of the function descriptive of the sectional shape of the projection when falling within the range of −10 to 20 [1/unitary length], where the unitary length (a. u.) is represented by the length of such each portion of projection as measured in a direction parallel to the direction of travel of light can effectively provides a high luminance in the frontal direction.

Figure 4A:
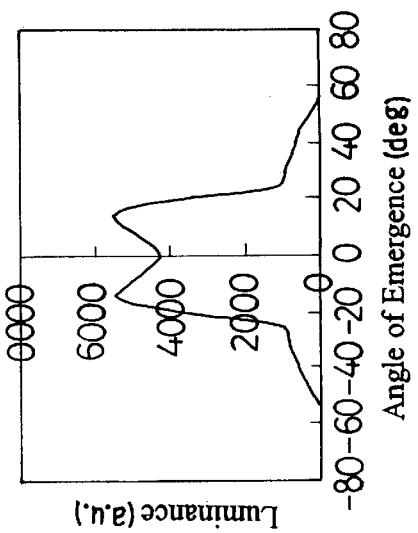
FIGS. 4A to 4C are characteristic graphs showing examples of results of calculation of the luminances of the functions shown in FIGS. 2A to 2C, respectively.
Figure 4B:
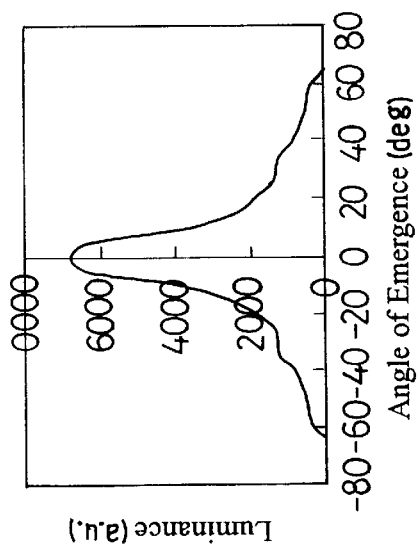
Figure 4C:
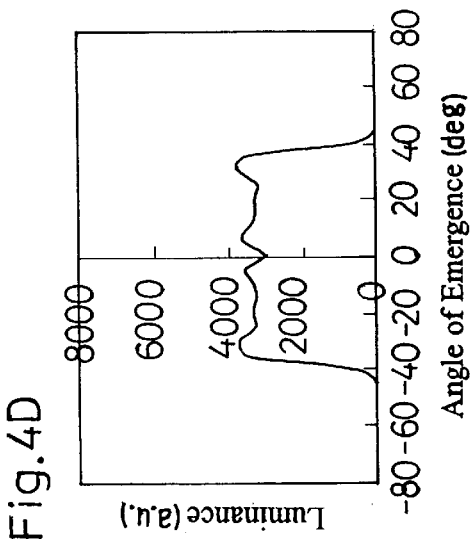
Figure 4D:
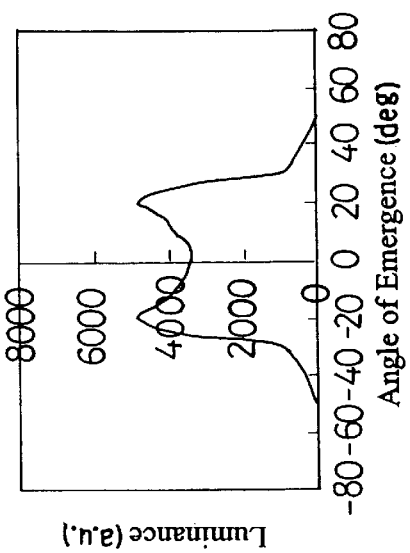
FIG. 4D is a characteristic graph showing an example of a result of calculation of the luminance of the function shown in FIG. 2D.

As shown by the results of calculation of the pattern of distribution of the luminance shown in FIG. 4, the use of the sectional shape of the projections according to the present invention shown in FIGS. 4A to 4C is effective to provide a planar light source device capable of providing a high luminance in the frontal direction as compared with the conventional sectional shape of the projections shown in FIG. 4D.

Figure 7A:
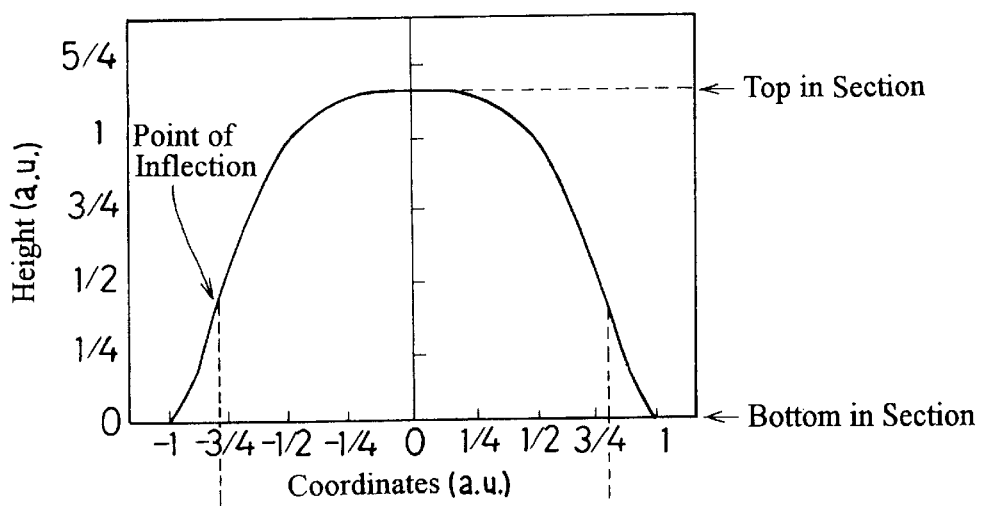
FIG. 7A is a characteristic chart showing a function descriptive of the sectional shape of a projection having a point of inflection on the light output plate.
Figure 7B:
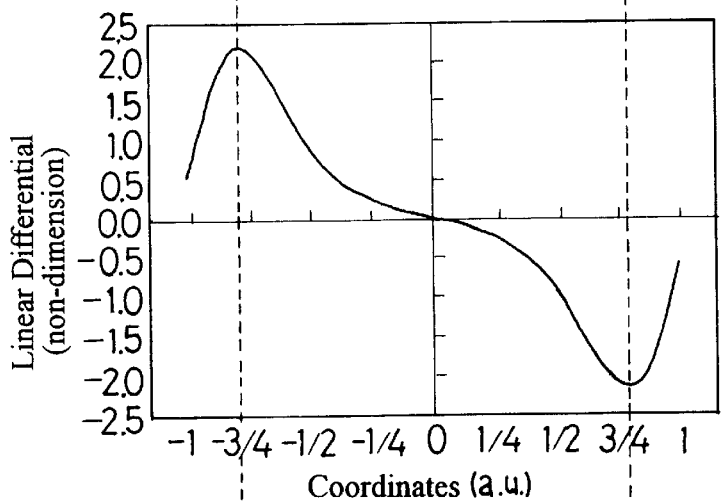
FIG. 7B is a characteristic chart showing a linear differential function of FIG. 7A.
Figure 7C:
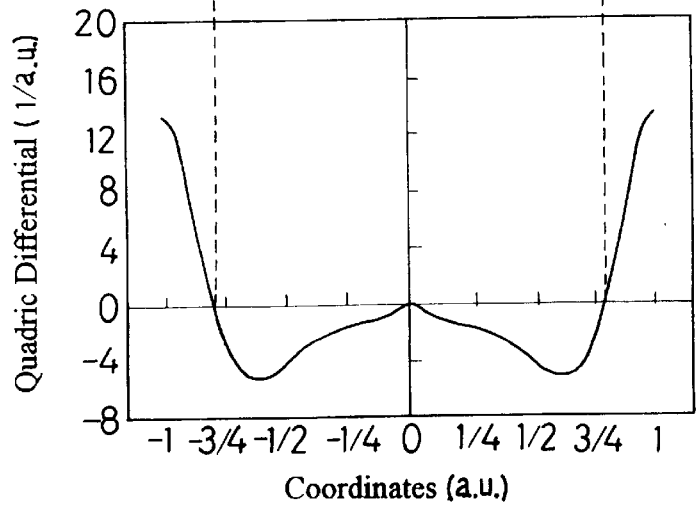
FIG. 7C is a characteristic chart showing a quadric differential function.
Figure 8A:
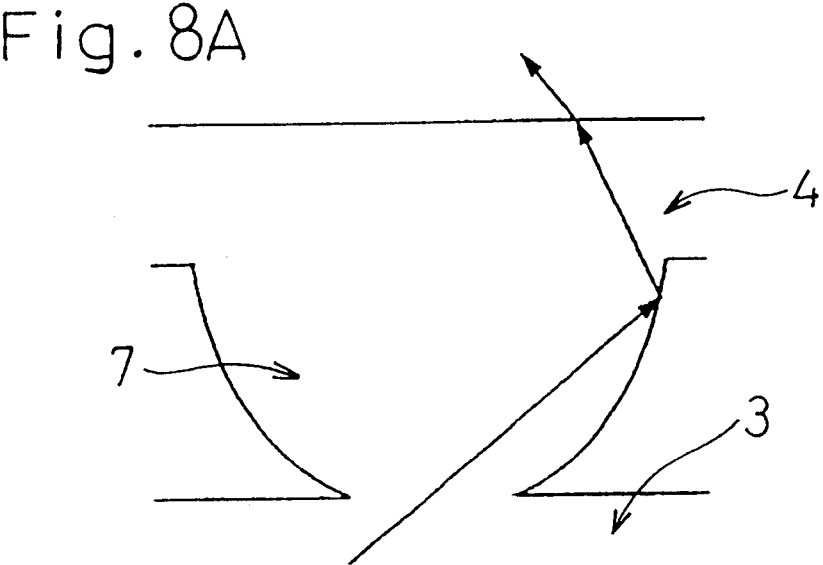
FIG. 8 is an explanatory diagram showing increase in characteristic resulting from the presence of a point of inflection in the function descriptive of the sectional shape of the projection.
Figure 8B:
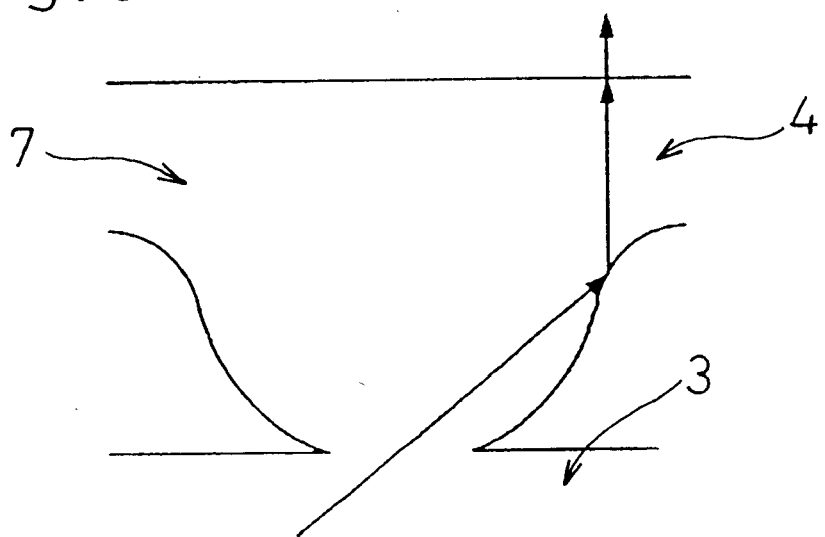

Also, the inventors of the present invention have found that if of the functions descriptive of the sectional shapes of the projections the function descriptive of the surface opposite to the light source has a point of inflection, the luminance in the frontal direction can be increased. FIGS. 7A to 7C illustrates examples of the functions descriptive of the sectional shapes of the projections each having the point of inflection, linear differentials thereof and quadric differentials thereof. The principle thereof will now be described with reference to FIG. 8. In general, light incident at a relatively great angle of incidence reaches a skirt portion of the projection. As shown in FIG. 8A, where the function descriptive of the sectional shape of the projection has no point of inflection, the angle of inclination of a perimeter portion of the projection is relatively great and, therefore, the luminance in the frontal direction decreases having been reflected toward the light source. In contrast thereto, as shown in FIG. 8B, where the function descriptive of the sectional shape of the projection has a point of inflection, the angle of inclination at the skirt portion of the projection is relatively gentle and, therefore, it is possible to allow the incident light to emerge outwardly in the frontal direction even though the angle of incidence of light is large.

The light guide member that can be used in the planar light source device may be made of a resin, excellent in transparency, such as an acrylic resin (PMMA), a polycarbonate resin (PC) or polystyrene resin (PS), or a glass that is molded to a predetermined shape. Of them, the acrylic resin is preferred because of its light-weight feature and transparency. Molding may be carried out by a method in which it is cut from an extruded plate or a cast plate, or a melt molding method such as a heated press, injection molding or the like.

Also, the light output plate has a surface shape which may be formed on a transparent substrate by means of a thermal press method, a 2P method utilizing a ultraviolet curing process, a cast method utilizing a thermosetting, an injection molding method with the use of a stamper or a female mold. The transparent substrate referred to above may be a plate of a resin such as an acrylic resin, a polycarbonate resin, a polystyrene resin or the like, or a plate glass. The stamper used in formation of the light output plate can be fabricated by coating a negative or positive photosensitive resin on, for example, a glass substrate, exposing the photosensitive resin coating to light through a photomask, and electroforming after having been developed. Alternatively, the stamper can be fabricated by the use of a grinding technique. In any event, the light output plate may not be in the form of a plate having a substantial thickness, but may be in the form of a film.

The projections on the light output plate employed in the practice of the present invention may not be of a type having a pattern similar to a lenticule in one dimensional arrangement such as shown in FIG. 1, but may be of a type having a lens array in two-dimensional arrangement. Also, the light exit surface of the light output plate may be provided with a microlenslet array. Adherence of the light output plate to the light guide member, and vice versa, may be carried out by the use of a bonding agent such as, for example, a ultraviolet curable bonding agent or a hot melt bonding agent, an adhesive material or a double-sided adhesive tape, whichever is excellent in transparency.

The direct-vision display device of the present invention can readily be available by providing a transmissive type display element on the light exit surface of the planar light source device of the structure hereinabove described. The transmissive type display element referred to above may include, for example, a liquid crystal panel of STN, TFT or MINI type. Also, in place of the transmissive type display element, using a printed film which is prepared by printing a transparent or translucent film, or a molded product of a colored plastic material, a display device such as, for example, an advertising billboard, an information display plate can be fabricated.

As hereinbefore described, according to the first preferred embodiment of the present invention, the planar light source device exhibiting a high efficiency of utilization of light and an increased luminance in the frontal direction can be obtained. Similarly, the display device utilizing this planar light source device exhibits a high luminance in the frontal direction.

Figure 9:
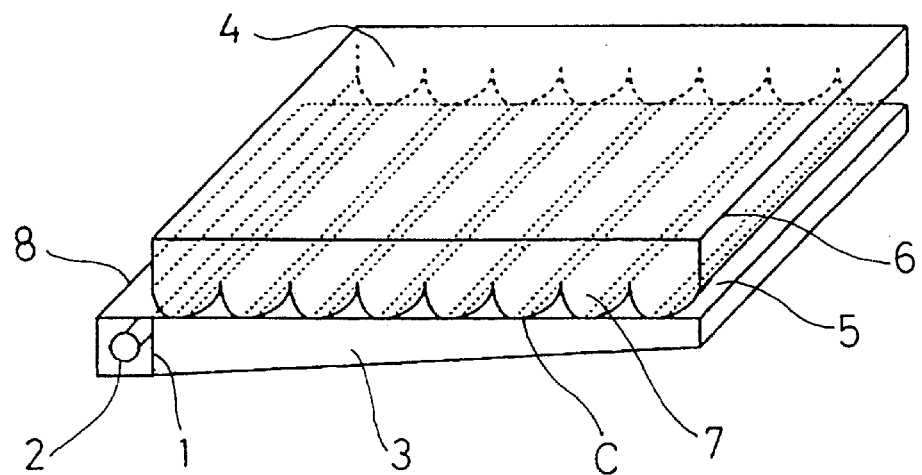
FIG. 9 is a perspective view showing a schematic structure of the planar light source device according to a second preferred embodiment of the present invention.
Figure 11:
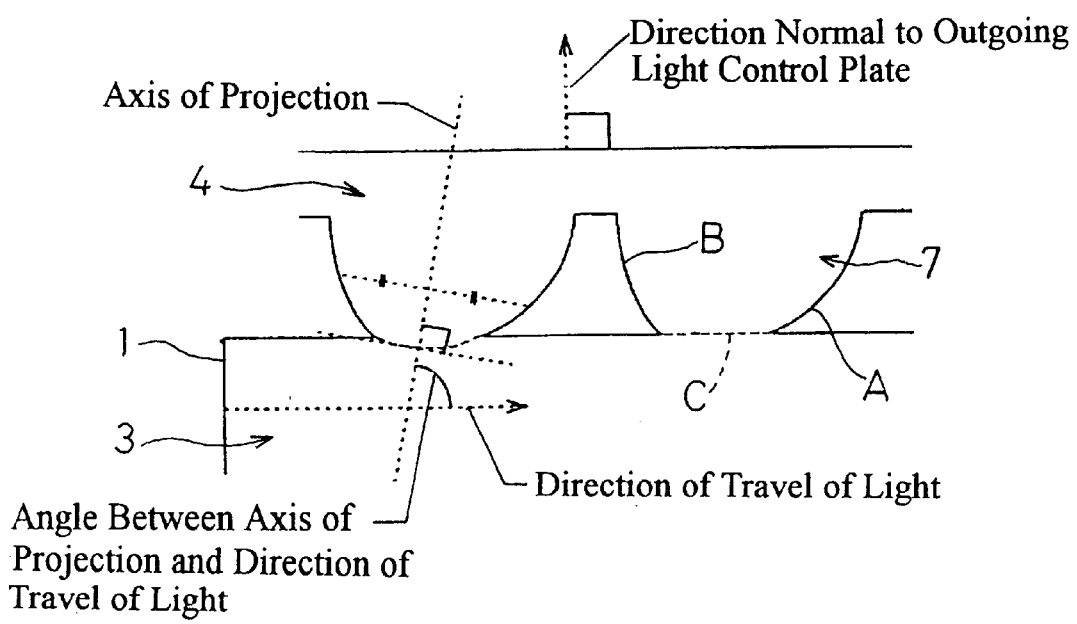
FIG. 11 is an enlarged sectional view showing the light output plate employed in the planar light source device according to the second preferred embodiment of the present invention.

The planar light source device according to a second preferred embodiment of the present invention is schematically shown in FIG. 9. The planar light source device is different from that according to the first embodiment thereof in that, as shown in FIG. 9, only one light source 2 is disposed in the vicinity of one of the opposite end faces of the light guide member 3 and in that as shown in FIG. 11, each of the projections 7 has inclined facets A and B opposite to each other and having respectively different shapes. Other structural features of the planar light source element shown in FIG. 9 are similar to those in the first embodiment of the present invention.

Figure 10:
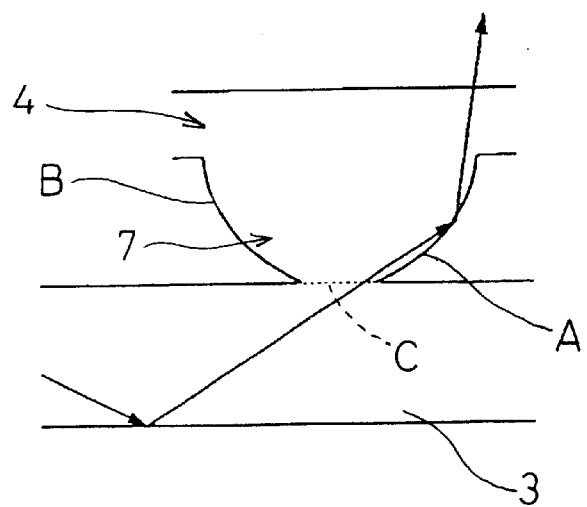
FIG. 10 is an explanatory diagram showing a function of the light output plate.

With the conventional planar light source device shown in FIG. 10, the incident light entering the light guide member 3 propagates while repeatedly undergoing total reflection within the light guide member 3. This incident light enters the light output plate 4 through the interface between the light exit surface of the light guide member 3 and the projections of the light output plate and then emerges outwardly from the light output plate after having undergone total reflection at the inclined facets A of the projections that face towards the end face of an incident end face of each projection of the light output plate. However, since the conventional planar light source device utilizes only the inclined facets A of the projections, the opposite inclined facets B thereof are good for nothing and regions adjacent thereto are not effectively utilized. Therefore, the efficiency of utilization of light with the conventional light source device is low, making it difficult to provide the high luminance planar light source device.

Considering the inclined facets B of the projections that face towards the incident end face of the projection of the light output plate are not utilized in the conventional design, the planar light source device according to the second embodiment of the present invention has been so designed to reduce the proportion of the inclined facets B of the projections so that the number of the projections used can be increased with a view to increase the luminance. A portion of the planar light source device according to this second embodiment of the present invention is shown in Fig. 11 on an enlarged scale. In the practice of the second embodiment, an axis of each of the projections is inclined relative to the normal to the light output plate to thereby reduce the proportion of the inclined facets B of the projections. It is to be noted that the direction of inclination of the axis of each projection is such as to allow the angle between the axis of each projection and the direction of travel of light to be acute.

Figure 12:
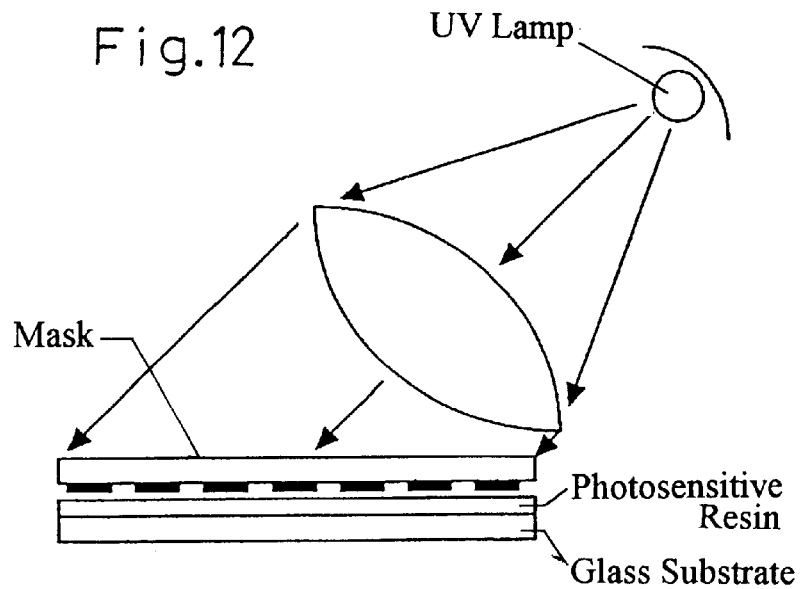
FIG. 12 is a schematic diagram showing a process of making the light output plate employed in the planar light source device according to the second preferred embodiment of the present invention.

An example of a process of making the light output plate according to the second embodiment is schematically shown in FIG. 12. A positive photosensitive resin is first applied on a glass substrate to form a resin coat of a uniform film thickness, and a mask having a light transmitting and shielding capability is placed over the resin coat on the glass substrate. Thereafter, the glass substrate having the resin coat with the mask placed thereon is irradiated by ultraviolet rays of light in a slantwise direction as shown. After the glass substrate has been developed and heat-treated, a pattern of surface irregularities each having an axis that is inclined can be obtained. Using this pattern, a stamper is prepared by means of a nickel electroforming technique.

Thereafter, a UV curable resin of an acrylic system is applied on a polyethylene terephthalate which serves as a substrate and, after the stamper has subsequently been pressed against the UV curable resin on the substrate, ultraviolet rays of light is projected from the side of the film to accomplish molding. In this way, the intended light output plate can be obtained.

After completion of the intended light output plate in the manner described above, a transparent bonding agent is applied to one surface of the light guide member, followed by bonding of the light output plate to the light guide member. The planar light source device according to the second embodiment of the present invention completes when the light source and the corresponding reflector shade are fitted to the assembly of the light guide member and the light output plate. The planar light source device so assembled exhibits a high luminance as compared with that wherein the axis of each projection is not inclined.

As hereinabove described, according to the second embodiment of the present invention, the planar light source device exhibiting a high efficiency of utilization of light and an increased luminance in the frontal direction can be obtained. Similarly, the display device utilizing this planar light source device exhibits a high luminance in the frontal direction.

Figure 13:
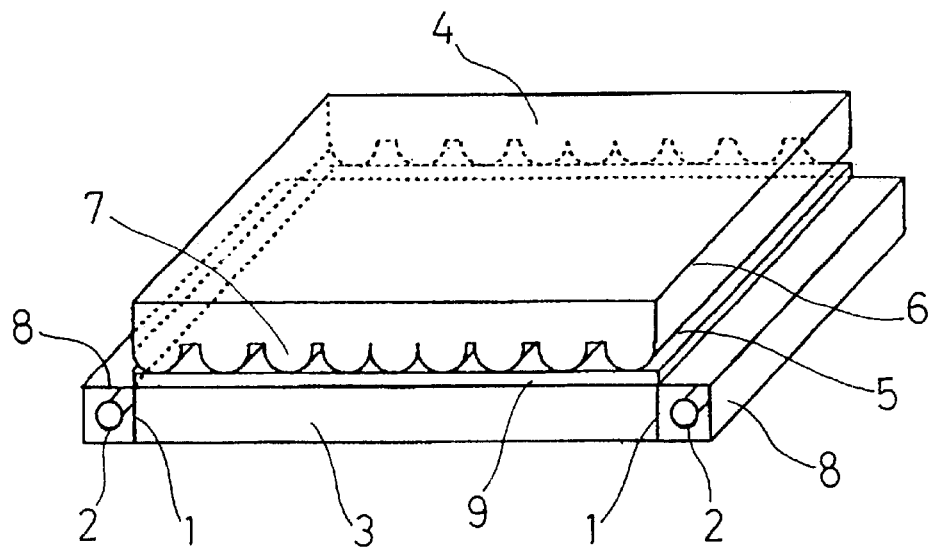
FIG. 13 is a perspective view showing a schematic structure of the planar light source device according to a third preferred embodiment of the present invention.

FIG. 13 illustrates a schematic structure of the planar light source device according to a third preferred embodiment of the present invention. Unlike that according to the first embodiment, the planar light source device shown therein is of a design in which tips of the multiplicity of the projections 7 formed on a light incident surface 5 of the light output plate 4 that are adjacent the light guide member are held in tight contact with the adjacent light exit surface of the light guide member through an adhesive layer 9 and the projections 7 are so arranged that some of the projections 7 adjacent each of the light sources are distributed loosely while some of the projections 7 at a location generally intermediate between the light sources are distributed densely as shown in FIG. 13. Other structural features of the planar light source device shown in FIG. 13 are similar to those of the planar light source device according to the first embodiment. It is, however, to be noted that the arrangement in which some of the projections 7 adjacent each of the light sources are distributed loosely while some of the projections 7 at a location generally intermediate between the light sources are distributed densely is effective to provide a pattern of uniform distribution of luminance.

Let it be assumed that the refractive index of the light guide member is expressed by $n_A$, the refractive index of each projection of the light output plate is expressed by $n_B$, and the refractive indexes of a plurality M of plies between the light guide member and the projections (wherein M is an integer) in the order from the light guide member are expressed respectively by $n_1, n_2, \ldots$ and $n_M$. In order for the incident light to be guided into the projections of the light output plate efficiently, the following relation must be satisfied:

$$n_A < n_B \quad (1)$$

Figure 14:
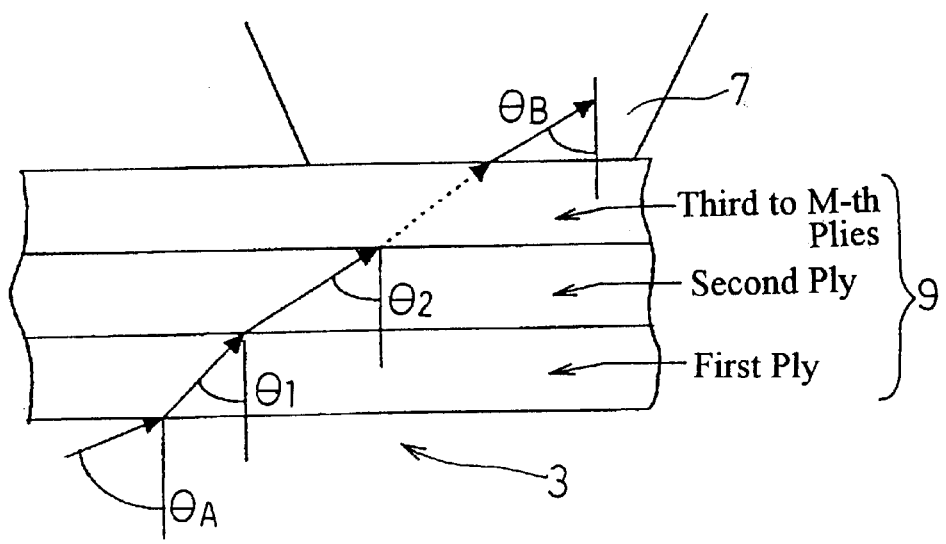
FIG. 14 is a diagram showing a direction of travel of light through an adhesive layer.

As shown in FIG. 14, assuming that the angle of incidence of light impinging from the light guide member on the first ply of the adhesive layer 9 is expressed by $\theta_A$ and the angles of propagation of the light through the successive plies of the adhesive layer 9 are expressed by $\theta_1, \theta_2, \ldots$ and $\theta_M$, the following relation can establish:

$$n_A \cdot \sin(\theta_A) = n_1 \cdot \sin(\theta_1) = n_2 \cdot \sin(\theta_2) = \cdots = n_M \cdot \sin(\theta_M) \quad (2)$$

$$n_B \cdot \sin(\theta_B) \cdots$$

If one of $n_1, n_2, \ldots$ and $n_M$ is smaller than $n_A$, and the refractive index thereof is expressed by $n_L$, the light incident at an angle greater than the critical angle $\theta_C$, wherein $\theta_A$ is determined by the following relation (3), undergoes total reflection and does not enter the projections of the light output plate.

$$\theta_C = \sin^{-1}(n_L/n_A) \quad (3)$$

Accordingly, the amount of the light incident on the light output plate decreases, accompanied by lowering of the luminance. In order to suppress the lowering of the luminance resulting from the total reflection, it is necessary that any one of $n_1, n_2, \ldots n_M$ must be greater than $n_A$.

Also, even though the total reflection is suppressed, the reflected light occurs due to the difference in refractive index with the result of the luminance lowered. To avoid this lowering of the luminance, it is recommended to suppress the total reflectivity after the light have passed through each ply of the adhesive layer 9. For this purpose, the following relation (4) should be established.

$$n_A \leq n_1, n_2, \ldots n_m \leq n_B \quad (4)$$

By way of example, using the light guide member made of an acrylic resin and having a refractive index of 1.49, which is held in tight contact with the projections of the light output plate through the adhesive layer made up of a single ply, studies have been made to determine how the luminance characteristic change with change of the refractive index of the adhesive layer. As a result, it has been found preferable that the refractive index of the adhesive layer be within the range of 1.51 to 1.54.

As hereinabove described, according to the third embodiment of the present invention, since the intensity of light tending to emerge outwardly in a direction slantwise, that is, diverting from the frontal direction can be lowered, it is possible to provide the planar light source device exhibiting a high efficiency of utilization of light and an increased luminance in the frontal direction. Similarly, the display device utilizing this planar light source device exhibits a high luminance in the frontal direction.

Figure 16:
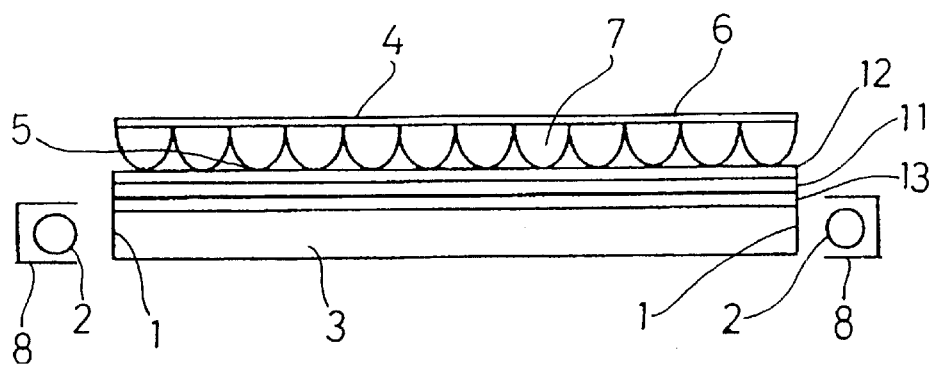
FIG. 16 is a side view showing a schematic structure of the planar light source device according to a fourth preferred embodiment of the present invention.
Figure 17:
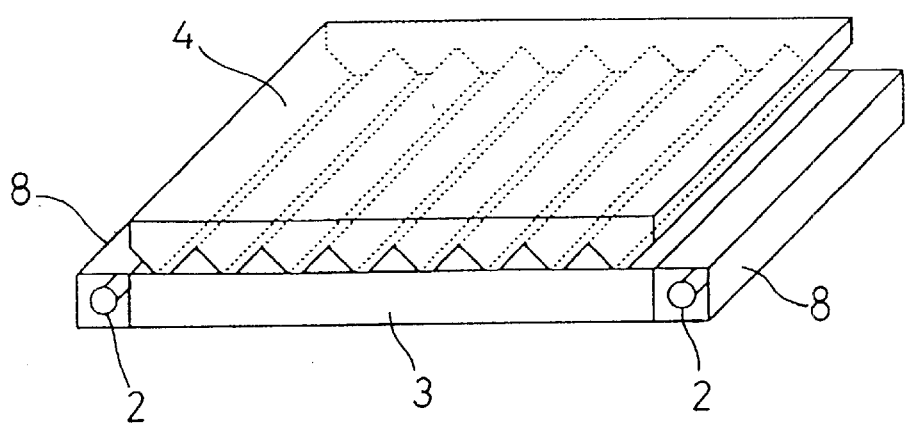
FIG. 17 is a perspective view of a planar light source device having no intermediate film used.
Figure 18:
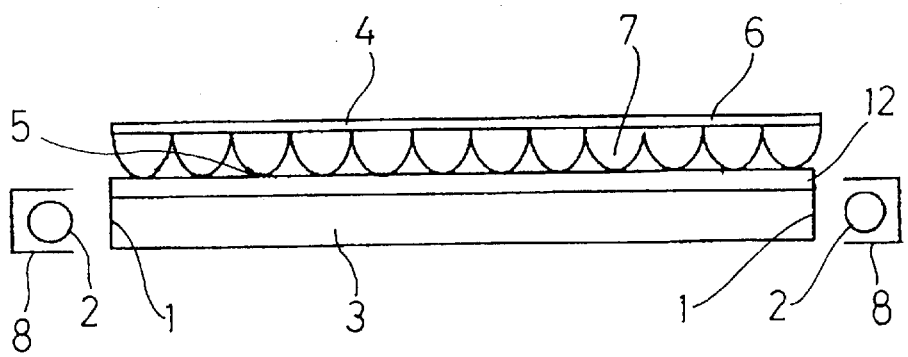
FIG. 18 is a side view showing the structure of the prior art planar light source device.

The planar light source device according to a fourth preferred embodiment of the present invention is shown in FIG. 16. Unlike that according to the first embodiment, the planar light source device shown therein is of a design in which tips of the multiplicity of the projections 7 formed on a light incident surface 5 of the light output plate 4 that are adjacent the light guide member are held in tight contact with the adjacent light exit surface of the light guide member through an adhesive layers 12 and 13 with an intermediate film 11 intervening between the adhesive layers 12 and 13. The intermediate film 11 is optically coupled with the tips of the projections 7 on one hand and with the light guide member 3 on the other hand. Other structural features of the planar light source device shown in FIG. 16 are similar to those of the planar light source device according to the first embodiment.

The incident light entering the light guide member 3 through the end faces 1 thereof propagates while repeatedly undergoing total reflection within the light guide member 3 affixed with the intermediate film. This incident light emerges outwardly from the light output plate through an interface between the projections 7 and the intermediate film. Accordingly, the light propagating within the light guide member emerges through the interface. The light so emerging subsequently undergoes total reflection and is condensed within the projection of the light output plate.

The intermediate film 11 employed in accordance with this embodiment of the present invention has its opposite surface adhering to the first adhesive layer 12 and the second adhesive layer 13, respectively. A material for the intermediate film is a transparent resinous film of a kind wherein the ratio of the hygroscopic expansion coefficient of the intermediate film relative to that of the light output plate is chosen to be within the range of 0.1 to 10 or the ratio of the thermal expansion coefficient of the intermediate film relative to that of the light output plate is chosen to be within the range of 0.5 to 2. In addition, it is preferred that the absolute value of the difference between the expansion coefficient of the intermediate film and that of the light output plate is equal to or smaller than that between the expansion coefficient of the intermediate film and the light guide member. This is because the planar light source device in which layer separation occurs hardly can be obtained. The intermediate film may be in the form of a transparent film made of acrylic resin, polycarbonate resin, or cellulose acetate triacetate resin (TAC). Adhesive material for the first and second adhesive layers may be suitably chosen from a group consisting of a ultraviolet curable adhesive material, a thermosetting material, a hot melt material, an adhesive material and others.

The planar light source device of the present invention can be fabricated by bonding the intermediate film to the tips of the projections of the light output plate by the use of a bonding agent and then bonding the assembly to the light guide member by the use of a bonding agent. At the time the intermediate film is bonded to the tips of the projections of the light output plate, the bonding agent is preferably semi-hardened beforehand and, after the bond layer of the laminated film and the tips of the projections of the light output plate are brought to tight contact with each other while the bonding agent is in a condition attaining a high hardness, the bonding agent is finally hardened completely. This procedure is particularly preferred since it is possible to prevent the tips of the projections of the light output plate from being embedded in the resultant bond layer. The foregoing bonding can readily be achieved by the use of any known laminating machine.

As hereinabove described, according to the fourth embodiment of the present invention, since the shearing force developed as a result of change in environment can be centered in between the light guide member and the intermediate film, the shearing force which will develop between the projections and the intermediate film for emergence of light can be relieved, making it difficult for the light output plate to separate, the planar light source device robust against change in environment can be obtained.

Hereinafter, the present invention will be demonstrated by way of examples that are taken only for the purpose of illustration and are not limitative of the scope of the present invention.

EXAMPLE 1

The light output plate was prepared by applying a ultraviolet curable resin of an acrylic system (1.55 in refractive index after having been hardened) to a substrate, that is, a polycarbonate film of 200 $\mu$m in thickness so as to form a acrylic resin layer of 100 $\mu$m, pressing the resin applied substrate to a mold, and irradiating the resin applied substrate with ultraviolet rays of light from the side of the polycarbonate film to thereby form lenticular projections in one dimensional arrangement. The mold was prepared by grinding. On the other hand, as the light guide member, an acrylic plate of 8 mm in thickness having a refractive index of 1.54 and having a size of 300×300 mm was used.

Figure 15:
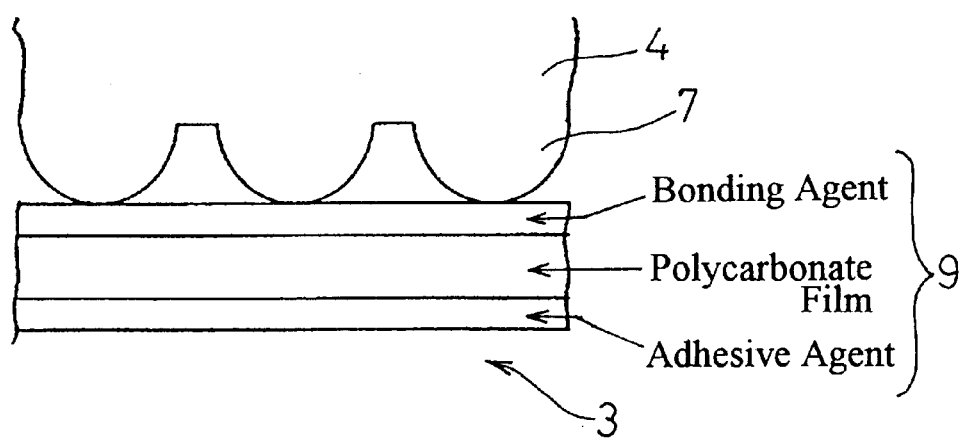
FIG. 15 is a schematic diagram showing the adhesive layer employed in the practice of the third preferred embodiment of the present invention.

A transparent polycarbonate film having a refractive index of 1.58 was prepared with its opposite surfaces applied with a bonding material of 1.54 in refractive index and an adhesive material of 1.58 in refractive index. After the light output plate prepared in the manner described above had been stuck to the surface of the polycarbonate film where the bonding material had been applied, the light guide member was bonded to the surface of the polycarbonate film where the adhesive material had been applied to thereby complete a composite plate. A portion of the polycarbonate film bonded with the light output plate is shown in FIG. 15. The resultant composite plate is combined with a light source and a reflector shade to thereby complete the planar light source device. When this planar light source device was evaluated, a favorable luminance characteristic was observed.

EXAMPLE 2

The light output plate was prepared in the following manner. A photosensitive resin was applied to a glass substrate to form a photosensitive resin layer of 30 $\mu$m in thickness and was then exposed through a photomask, followed by development. A pattern of the photomask for formation of the projections had slits of 6 $\mu$m deployed in a cycle of 40 $\mu$m. After the development, the photosensitive resin on the glass substrate was heat-treated to provide a master plate having lenslet projections. This resultant master plate was subsequently electroformed to provide a stamper, followed by filling of a ultraviolet curable resin between the stamper and a PC film. The assembly is then irradiated with ultraviolet rays of light to harden the photosensitive resin to thereby transfer of a pattern of surface irregularities to a surface of the PC film of 200 $\mu$m in thickness, thereby completing the desired light output plate.

The PC film was used for the substrate of the light output plate and also for the intermediate film. Since the substrate of the light output plate and the PC film are made of the same material, both the ratio of the thermal expansion coefficients thereof and the ratio of the hygroscopic expansion coefficients thereof were 1.

In this Example 2, since only the tips of the projections of the light output plate are bonded, the ultraviolet curable resin was used for the bonding material. Using a bar coater, the bonding material was applied to one surface of the PC film of 100 $\mu$m in thickness, which eventually serve as the intermediate film, to form the first bond layer which was subsequently laminated with a PET film of 100 $\mu$m by the use of a laminating machine. The opposite surface of the PC film had been applied with the adhesive material to form the second adhesive layer of 30 $\mu$m.

Thereafter, from a side of the PET film, ultraviolet rays of light emitted from a high pressure mercury lamp is projected so that the first bond layer in which the ultraviolet curable resin is semi-hardened can be prepared. Preparation of the first bond layer having the semi-hardened ultraviolet curable resin is for the purpose of increasing the hardness of the ultraviolet curable resin to thereby preventing the tips of the projections from being embedded in the bond layer. The PET film is then peeled off, leaving the bond layer resting on the intermediate film. Thereafter, the light output plate is pressed from above and is stuck to the intermediate film under a pressing force of 0.3 kgf/cm$^2$ by the use of a laminating machine.

Finally, from a side of the light output plate, ultraviolet rays of light emitted from a high pressure mercury lamp is projected to completely harden the first bond layer. The light output plate so bonded together with the intermediate film is then stuck to the light guide member through the second bond layer of the adhesive material. As the light guide member, a PMMA plate of 8 mm in thickness having 340 mm in width and 280 mm in length (the distance between the light sources) was used.

EXAMPLE 3

Using a PMMA film and a TAC film for the light output plate and the intermediate film, respectively, the planar light source device was prepared in a manner similar to that in Example 2.

COMPARISON 1

For comparison purpose, the planar light source device was prepared in a manner similar to Example 1, but in which no intermediate film was employed.

COMPARISON 2

For comparison purpose, the planar light source device was prepared in a manner similar to Example, 2, except that a PC film and a PET film were used for the light output plate and the intermediate film, respectively.

The planar light source devices of Examples 2 and 3 and those of Comparisons 1 and 2 were subjected to environmental impact tests by placing them under an environment of a temperature of 60° C. and a relative humidity of 90% and also under an environment of a temperature of 70° C. The thermal expansion coefficients and the hygroscopic expansion coefficients of the light output plate, the intermediate film and the material for the light guide member of each of the devices tested are tabulated in Table 1. Results of the environment impact tests are also tabulated in Table 2.

TABLE 1

|  | Thermal Expansion Coefficient (mm/mm/° C.) | Hygroscopic Expansion Coefficient(mm/mm/% RH) |
| --- | --- | --- |
| PMMA | $7 \times 10^{-5}$ | $35 \times 10^{-5}$ |
| PC | $7 \times 10^{-5}$ | $20 \times 10^{-5}$ |
| PET | $2.7 \times 10^{-5}$ | $0.2 \times 10^{-5}$ |
| TAC | $10 \times 10^{-5}$ | $4 \times 10^{-5}$ |

TABLE 2

|  |  |  | Exam. 2 | Exam. 3 | Comp. 1 | Comp. 2 |
| --- | --- | --- | --- | --- | --- | --- |
| Plate 4 |  |  | PC | PMMA | PC | PC |
| Film 11 |  |  | PC | TAC | not used | PET |
| Test |  |  |  |  |  |  |
| 60° C. & 90% RH | Time (hr.) | 500 | No change | No change | Slight peel | Slight peel |
|  |  | 1000 | No change | No change | Slight peel | Slight peel |
| 70° C. | Time (hr.) | 500 | No change | No change | Slight peel | Slight peel |
|  |  | 1000 | No change | No change | Slight peel | Slight peel |

[Note: "Slight peel" means occurrence of slight separation at an end portion.]

With respect to the environment impact test under a temperature of 60° C. and a relative humidity of 90% and that under a temperature of 70° C. it has been found that a slight separation occurred at an end portion of the light output plate used in each of Comparisons 1 and 2 whereas no separation occurred in the light output plate used in each of Examples 2 and 3 even after passage of 1,000 hours. As for Comparison 1 where no intermediate film is used, stress setup occurred at a bonded region of the tips of the projections of the light output plate. In contrast thereto, in each of Examples 2 and 3, it appear that stress setup would have been centered at the interface between the intermediate film and the light guide member. Also, as shown by Comparison 2 wherein the expansion coefficients of the material for the intermediate film differ considerably from those of the material for the light output plate, the separation took place and, therefore, it can be concluded that the expansion coefficients of the material for the intermediate film should be equal to or about equal to those of the material for the light output plate as hereinbefore discussed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A planar light source device which comprises:

a light source;

a reflector shade;

a light guide member having at least one side face positioned adjacent the light source for receiving light that is emitted from the light source and reflected by the reflector shade, said light guide member having a light exit surface; and a light output plate having first and second surfaces opposite to each other and positioned in face-to-face relation with the light guide member with the first surface positioned adjacent the light exit surface of the light guide member, said first surface being formed with a multiplicity of projections having respective tips held in tight contact with the light exit surface of the light guide member, at least a portion of each of the projections having a curved facet;

wherein of a function descriptive of a sectional shape of each of the projections that is parallel to a direction of travel of light and also a direction normal to the light output plate, the maximum value of the absolute value of a linear differential of a portion representative of a facet counter to the light source is chosen to be within the range of 1 to 3.

2. The planar light source device as claimed in claim 1, wherein of the function descriptive of the sectional shape of each of the projections a quadric differential value of that portion representative of the facet counter to the light source is chosen to be within the range of −10 to 20 [1/unitary length], where the unitary length (a. u.) is represented by a length of such each portion of projection as measured in a direction parallel to the direction of travel of light.

3. The planar light source device as claimed in claim 2, wherein of the function descriptive of the sectional shape of each of the projections a quadric differential value of that portion representative of the facet counter to the light source has a point of inflection.

4. The planar light source device as claimed in claim 1, wherein each of the projections has an axis inclined relative to the direction normal to the light output plate and forms an acute angle relative to the direction of travel of light.

5. The planar light source device as claimed in claim 2, wherein each of the projections has an axis inclined relative to the direction normal to the light output plate and forms an acute angle relative to the direction of travel of light.

6. The planar light source device as claimed in claim 3, wherein each of the projections has an axis inclined relative to the direction normal to the light output plate and forms an acute angle relative to the direction of travel of light.

7. The planar light source device as claimed in claim 1, wherein the light guide member and the tips of the projections of the light output plate are optically coupled with each other through at least one optically transparent layer.

8. The planar light source device as claimed in claim 7, wherein the projections of the light output plate has a refractive index that is greater than the refractive index of the light guide member and the refractive index of the optically transparent layer is greater than the refractive index of the light guide member.

9. The planar light source device as claimed in claim 8, wherein the optically transparent layer positioned between the light guide member and the light output plate has a refractive index that is smaller than the refractive index of the projections of the light output plate.

10. The planar light source device as claimed in claim 7, wherein the optically transparent layer includes at least an intermediate film and a bond layer disposed on each of opposite surfaces of the intermediate film and the ratio of a hygroscopic expansion coefficient of the intermediate film relative to that of the light output plate is chosen to be within the range of 0.1 to 10.

11. The planar light source device as claimed in claim 7, wherein the optically transparent layer includes at least an intermediate film and a bond layer disposed on each of opposite surfaces of the intermediate film and the ratio of a thermal expansion coefficient of the intermediate film relative to that of the light output plate is chosen to be within the range of 0.5 to 2.

12. The planar light source device as claimed in claim 7, wherein the optically transparent layer includes at least an intermediate film and a bond layer disposed on each of opposite surfaces of the intermediate film and wherein the ratio of a thermal expansion coefficient of the intermediate film relative to that of the light output plate is chosen to be within the range of 0.5 to 2 and the ratio of a hygroscopic expansion coefficient of the intermediate film relative to that of the light output plate is chosen to be within the range of 0.1 to 10.

13. A method of making a planar light source device as defined in claim 10, wherein the tips of the projections of the light output plate and the intermediate film are bonded together by means of a bonding agent and the intermediate film and the light guide member are also bonded together by means of a bonding agent.

14. A method of making a planar light source device as defined in claim 11, wherein the tips of the projections of the light output plate and the intermediate film are bonded together by means of a bonding agent and the intermediate film and the light guide member are also bonded together by means of a bonding agent.

15. A method of making a planar light source device as defined in claim 12, wherein the tips of the projections of the light output plate and the intermediate film are bonded together by means of a bonding agent and the intermediate film and the light guide member are also bonded together by means of a bonding agent.

16. The method as claimed in claim 13, wherein the step of bonding the tips of the projections of the light output plate and the intermediate film together includes a substep of contacting them by means of a semi-hardened bonding agent and a substep of subsequently hardening the semi-hardened bonding agent completely.

17. The method as claimed in claim 14, wherein the step of bonding the tips of the projections of the light output plate and the intermediate film together includes a substep of contacting them by means of a semi-hardened bonding agent and a substep of subsequently hardening the semi-hardened bonding agent completely.

18. The method as claimed in claim 15, wherein the step of bonding the tips of the projections of the light output plate and the intermediate film together includes a substep of contacting them by means of a semi-hardened bonding agent and a substep of subsequently hardening the semi-hardened bonding agent completely.

19. A display device which comprises the planar light source device as defined in claim 1 and a transmissive type display element disposed on a light exit surface of the planar light source device.

20. A display device which comprises the planar light source device as defined in claim 2 and a transmissive type display element disposed on a light exit surface of the planar light source device.

21. A display device which comprises the planar light source device as defined in claim 3 and a transmissive type display element disposed on a light exit surface of the planar light source device.

22. The display device as claimed in claim 19, wherein the transmissive type display element is a liquid crystal display element.

23. The display device as claimed in claim 20, wherein the transmissive type display element is a liquid crystal display element.

24. The display device as claimed in claim 21, wherein the transmissive type display element is a liquid crystal display element.

25. A display device which comprises the planar light source device as defined in claim 1 and a printed film disposed on a light exit surface of the planar light source device.

26. A display device which comprises the planar light source device as defined in claim 2 and a printed film disposed on a light exit surface of the planar light source device.

27. A display device which comprises the planar light source device as defined in claim 3 and a printed film disposed on a light exit surface of the planar light source device.

28. A display device which comprises the planar light source device as defined in claim 1 and a molded member disposed on a light exit surface of the planar light source device and having a light scattering capability.

29. A display device which comprises the planar light source device as defined in claim 2 and a molded member disposed on a light exit surface of the planar light source device and having a light scattering capability.

30. A display device which comprises the planar light source device as defined in claim 3 and a molded member disposed on a light exit surface of the planar light source device and having a light scattering capability.

* * * * *